United States Patent
Hsieh

(10) Patent No.: US 7,644,261 B2
(45) Date of Patent: Jan. 5, 2010

(54) RESET DEVICE FOR A COMPUTER SYSTEM

(75) Inventor: Ming-Chih Hsieh, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 508 days.

(21) Appl. No.: 11/309,878

(22) Filed: Oct. 17, 2006

(65) Prior Publication Data
US 2007/0283136 A1 Dec. 6, 2007

(30) Foreign Application Priority Data
Jun. 2, 2006 (CN) .................... 2006 1 0060941

(51) Int. Cl.
*G06F 15/177* (2006.01)
*G06F 11/00* (2006.01)
(52) U.S. Cl. .................... 713/1; 713/2; 714/15
(58) Field of Classification Search .......... 713/1, 713/2
See application file for complete search history.

(56) References Cited
U.S. PATENT DOCUMENTS
5,842,012 A 11/1998 Walker et al.
6,487,466 B1 * 11/2002 Miyabe .................. 700/82
7,159,107 B2 * 1/2007 Chen et al. ................ 713/2
7,260,166 B2 * 8/2007 Sweet ..................... 375/354

FOREIGN PATENT DOCUMENTS
EP 1562112 A1 * 8/2005
JP 2005085258 A * 3/2005

* cited by examiner

*Primary Examiner*—Suresh K Suryawanshi
(74) *Attorney, Agent, or Firm*—Wei Te Chung

(57) ABSTRACT

A reset device for a computer system is provided. The reset device includes a hardware-reset signal generating circuit for outputting a hardware-reset signal to reset the computer system, a first switch, and a second switch having a first contact, a second contact, and a third contact. The third contact can be selectively electrically connected to the first contact to enable the hardware-reset signal generating circuit to output the hardware-reset signal when the first switch is turned on, or the second contact to output a software-reset signal to a central processing unit of the computer system when the first switch is turned on.

11 Claims, 2 Drawing Sheets

RESET DEVICE FOR A COMPUTER SYSTEM

FIELD OF THE INVENTION

The present invention relates to computer systems, and particularly to a reset device for a computer system.

DESCRIPTION OF RELATED ART

Hardware-reset signal generating devices are used in computer systems. When a failure in a computer system occurs and the computer system hangs, the user can turn on (press down) a button switch set in a panel of the computer, the hardware-reset signal generating device thereby generates a hardware-reset signal, causing the computer system to reset and resume a normal state.

Referring to FIG. 2, a conventional hardware-reset signal generating device includes a hardware-reset signal generating circuit 100 and a button switch S1. The hardware-reset signal generating circuit 100 includes a resistor R1, a diode D1, a capacitor C1, and a 3.3V power supply source Vcc. The diode D1 and the resistor R1 are connected in parallel to each other but in series with the capacitor C1 between the power supply source Vcc and ground with a cathode of the diode D1 connected to the power supply source Vcc and an anode of the diode D1 connected to the capacitor C1. The button switch S1 is connected between the resistor R1 and ground. A node between the diode D1 and the capacitor C1 acts as a terminal for outputting a hardware-reset signal H/W-Reset. When the button switch S1 is not turned on, the voltage at the terminal is at a high level, and the system works normally. When the button switch S1 is turned on, the voltage at the terminal goes to a low level, and the hardware-reset signal H/W-Reset is generated and output to some chipsets of the computer, e.g., a central processing unit and a north bridge, resetting the computer system.

A computer in a communication network has an internet protocol address. If the computer hangs, the internet protocol address and related network settings may be changed. If the internet protocol address and related network settings change, even though the user turns on the button switch S1, the internet protocol address and related network settings cannot resume default values and the computer cannot connect with the communication network.

What is needed, therefore, is a reset device for a computer system, which makes the internet protocol address and related network settings resume default values.

SUMMARY OF THE INVENTION

A reset device for a computer system is provided. In a preferred embodiment, the reset device includes: a hardware-reset signal generating circuit for outputting a hardware-reset signal to reset the computer system; a first switch; and a second switch having a first contact electrically connected to the hardware-reset signal generating circuit, a second contact electrically connected to a power supply source and also electrically connected to a central processing unit, and a third contact electrically connected to ground via the first switch. The third contact can be selectively electrically connected to the first contact to enable the hardware-reset signal generating circuit to output the hardware-reset signal when the first switch is turned on, or the second contact to output a software-reset signal to the central processing unit when the first switch is turned on.

Other advantages and novel features will become more apparent from the following detailed description when taken in conjunction with the accompanying drawings, in which:

DETAILED DESCRIPTION OF THE INVENTION

Figure 1:
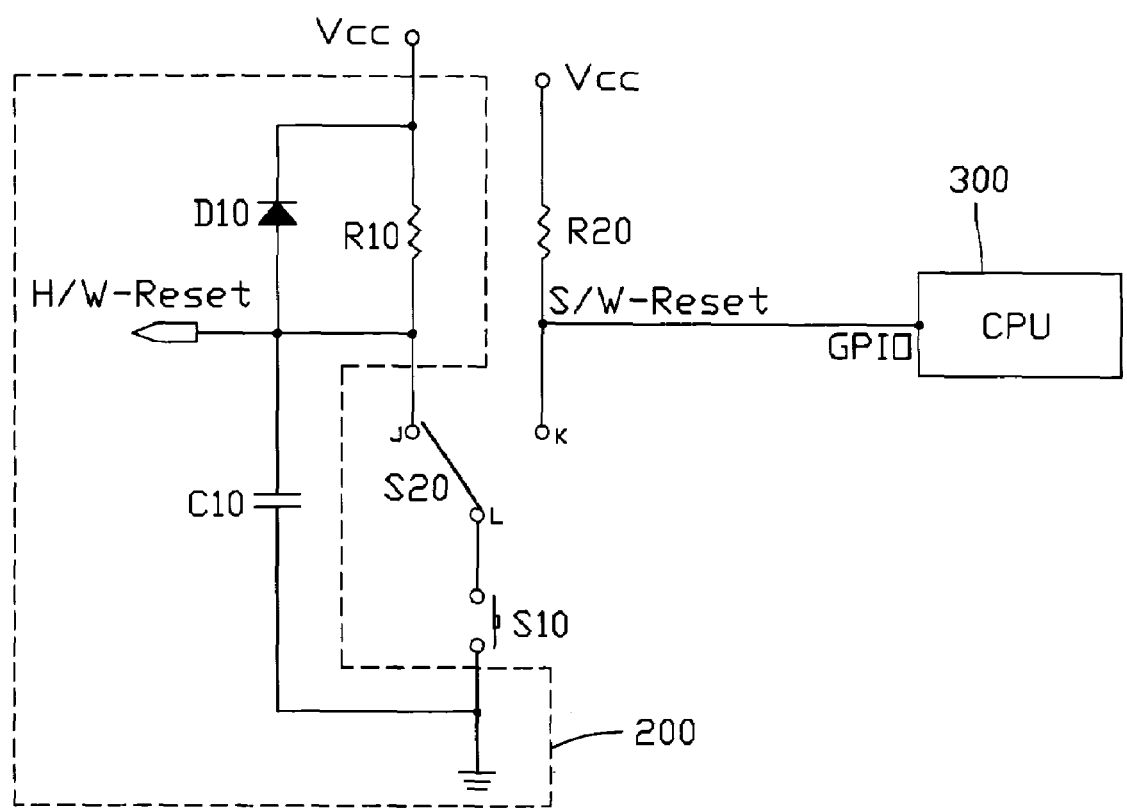
FIG. 1 is a circuit diagram of a reset device for a computer system, in accordance with a preferred embodiment of the present invention.
Figure 2:
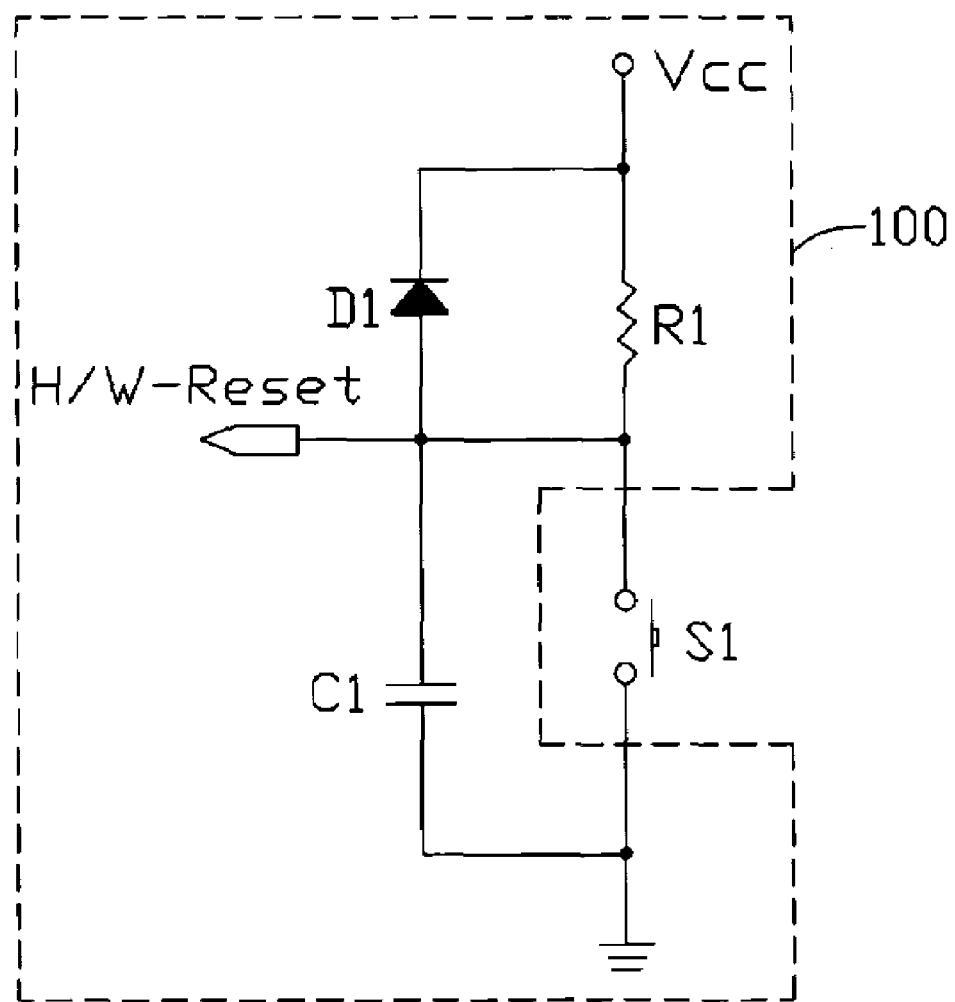
FIG. 2 is a circuit diagram of a conventional hardware-reset signal generating device.

Referring to FIG. 1, a reset device for a computer system in accordance with a preferred embodiment of the present invention includes a hardware-reset signal generating circuit 200, a 3.3V power supply source Vcc, a first switch S10, a second switch S20, and a resistor R20. The hardware-reset signal generating circuit 200 includes a resistor R10, a diode D10, and a capacitor C10. The diode D10 and the resistor R10 are connected in parallel to each other but in series with the capacitor C10 between the power supply source Vcc and ground with a cathode of the diode D10 connected to the power supply source Vcc and an anode of the diode D10 connected to the capacitor C10. A node between the diode D10 and the capacitor C10 acts as a terminal for outputting a hardware-reset signal H/W-Reset.

The first switch S10 is a button switch. The second switch S20 is a single-pole double-throw switch. The first switch S10 and the second switch S20 are set in a panel (not shown) of the computer. The second switch S20 includes a first contact J connected to the node between the diode D10 and the capacitor C10 of the hardware-reset signal generating circuit 200, a second contact K connected to the power supply source Vcc via the resistor R20 and also electrically connected to a general purpose input/output (GPIO) port of a central processing unit (CPU) 300, and a third contact L connected to ground via the first switch S10. The third contact L can be selectively electrically connected to the first contact J or the second contact K.

When the third contact L is electrically connected to the first contact J, and the first switch S10 is turned on, such a mode is called "hardware-reset." In the "hardware-reset" mode, the hardware-reset signal generating circuit 200 generates the hardware-reset signal H/W-Reset. The hardware-reset signal H/W-Reset is output to some chipsets of the computer, e.g., the CPU and a north bridge, resetting the computer system.

When the third contact L is electrically connected to the second contact K, and the first switch S10 is turned on, such a mode is called "software-reset." In the "software-reset" mode, a node between the resistor R20 and the second contact K outputs a low-level voltage as a software-reset signal S/W-Reset. The software-reset signal S/W-Reset is input to the GPIO port of the CPU 300. When the first switch S10 is not turned on, the voltage at the node between the resistor R20 and the second contact K goes to a high level. When the first switch S10 is turned on, a counter of the CPU 300 can count a duration the CPU 300 accepts the low-level voltage. A designer can set a counted time via firmware of the system, e.g. 5 seconds, acting as an action demarcation of the computer system. When the counted time is less than or equal to 5 seconds, and the computer system is not hanging, the computer system resets. When the counted time is greater than 5 seconds, and the computer system is not hanging, the computer system resumes default values, thereby an internet protocol address and related network settings resume default values.

In view of the foregoing, if the computer system is not hanging, the user can reset the computer system by turning on the first switch S10 in the "hardware-reset" mode, or turning on the first switch S10 for a time less than or equal to 5 seconds in the "software-reset" mode. If the computer system is hanging, the user needs to reset the computer system by turning on the first switch S10 in the "hardware-reset" mode. If the internet protocol address and related network settings change after the computer hangs, the user needs to reset the computer system by turning on the first switch S10 in the "hardware-reset" mode, and then switch to the "software-reset" mode and turn on the first switch S10 for a time greater than 5 seconds.

The foregoing description of the exemplary embodiment of the invention has been presented only for the purposes of illustration and description and is not intended to be exhaustive or to limit the invention to the precise forms disclosed. Many modifications and variations are possible in light of the above teaching. The embodiment was chosen and described in order to explain the principles of the invention and its practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiment described therein.

What is claimed is:

1. A reset device for a computer system, the reset device comprising:
   a hardware-reset signal generating circuit for outputting a hardware-reset signal to reset the computer system;
   a first switch; and
   a second switch having a first contact electrically connected to the hardware-reset signal generating circuit, a second contact electrically connected to a power supply source and also electrically connected to a central processing unit, and a third contact electrically connected to ground via the first switch, wherein the third contact can be selectively electrically connected to the first contact to enable the hardware-reset signal generating circuit to output the hardware-reset signal when the first switch is turned on to reset the computer system, or the second contact to output a software-reset signal to the central processing unit when the first switch is turned on, to activate a counter of the central processing unit to count a duration the central processing unit accepts the software-reset signal, when a counted time is less than or equal to a preset time and the computer system is not hanging, the computer system resets, when the counted time is greater than the preset time and the computer system is not hanging, the computer system resumes default values.

2. The reset device as claimed in claim 1, wherein the hardware-reset signal generating circuit comprises a resistor, a diode, and a capacitor, the diode and the resistor are connected in parallel to each other but in series with the capacitor between the power supply source and ground with a cathode of the diode connected to the power supply source and an anode of the diode connected to the capacitor, and a node between the diode and the capacitor acts as a terminal for outputting the hardware-reset signal.

3. The reset device as claimed in claim 1, wherein the second contact is electrically connected to the power supply source via a resistor, the node between the resistor and the second contact outputs a low-level voltage as the software-reset signal when the third contact is electrically connected to the second contact and the first switch is turned on.

4. The reset device as claimed in claim 3, wherein the software-reset signal is input to a general purpose input/output port of the central processing unit.

5. The reset device as claimed in claim 1, wherein the first switch is a button switch.

6. The reset device as claimed in claim 1, wherein the second switch is a single-pole double-throw switch.

7. A computer system comprises:
   a hardware-reset signal generating circuit for outputting a hardware-reset signal to reset the computer system;
   a central processing unit having a general purpose input/output port and a counter;
   a first switch; and
   a second switch having a first contact electrically connected to the hardware-reset signal generating circuit, a second contact electrically connected to a power supply source and also electrically connected to the general purpose input/output port, and a third contact electrically connected to ground via the first switch, wherein the third contact can be selectively electrically connected to the first contact to enable the hardware-reset signal generating circuit to output the hardware-reset signal when the first switch is turned on to reset the computer system, or the second contact to output a software-reset signal to the general purpose input/output port when the first switch is turned on, to activate the counter of the central processing unit to count a duration the central processing unit accents the software-reset signal, when a counted time is less than or equal to a preset time and the computer system is not hanging, the computer system resets, when the counted time is greater than the preset time and the computer system is not hanging, the computer system resumes default values.

8. The computer system as claimed in claim 7, wherein the hardware-reset signal generating circuit comprises a resistor, a diode, and a capacitor, the diode and the resistor are connected in parallel to each other but in series with the capacitor between the power supply source and ground with a cathode of the diode connected to the power supply source and an anode of the diode connected to the capacitor, and a node between the diode and the capacitor acts as a terminal for outputting the hardware-reset signal.

9. The computer system as claimed in claim 7, wherein the second contact is electrically connected to the power supply source via a resistor, the node between the resistor and the second contact outputs a low-level voltage as the software-reset signal when the third contact is electrically connected to the second contact and the first switch is turned on.

10. The computer system as claimed in claim 7, wherein the first switch is a button switch.

11. The computer system as claimed in claim 7, wherein the second switch is a single-pole double-throw switch.

* * * * *

UNITED STATES PATENT AND TRADEMARK OFFICE
CERTIFICATE OF CORRECTION

PATENT NO.        : 7,644,261 B2                                        Page 1 of 1
APPLICATION NO. : 11/309878
DATED             : January 5, 2010
INVENTOR(S)       : Ming-Chih Hsieh It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 588 days.

Signed and Sealed this

Sixteenth Day of November, 2010

David J. Kappos
*Director of the United States Patent and Trademark Office*